United States Patent
Xiang et al.

(10) Patent No.: US 11,178,227 B1
(45) Date of Patent: Nov. 16, 2021

(54) EFFICIENT RESYNCHRONIZATION FOR STALE COMPONENTS OF GEOGRAPHICALLY DISTRIBUTED COMPUTING SYSTEMS

(71) Applicant: VMware, Inc., Palo Alto, CA (US)

(72) Inventors: Enning Xiang, San Jose, CA (US); Pratik Shridhar Desai, San Jose, CA (US); Eric Shannon Knauft, San Francisco, CA (US); Yizhou Luo, New York, NY (US); Pascal Renauld, Palo Alto, CA (US); Yiqi Xu, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/097,479

(22) Filed: Nov. 13, 2020

(51) Int. Cl.
  *H04L 29/08* (2006.01)
  *G06F 9/50* (2006.01)
  *G06F 9/455* (2018.01)
  *H04L 12/911* (2013.01)

(52) U.S. Cl.
  CPC ...... *H04L 67/1097* (2013.01); *G06F 9/45558* (2013.01); *G06F 9/5083* (2013.01); *H04L 47/82* (2013.01); *H04L 67/1095* (2013.01); *G06F 2009/45583* (2013.01); *G06F 2009/45595* (2013.01)

(58) Field of Classification Search
  CPC ..... H04L 67/1097; H04L 47/82; H04L 29/08; H04L 12/911; G06F 9/50; G06F 9/455; G06F 9/5083; G06F 9/45558; G06F 9/45593
  See application file for complete search history.

(56) References Cited

U.S. PATENT DOCUMENTS

| | | | |
|---|---|---|---|
| 9,619,352 B2 * | 4/2017 | Patel | G06F 11/2082 |
| 9,774,702 B2 * | 9/2017 | Carricarte | H04L 67/42 |
| 2007/0199076 A1 * | 8/2007 | Rensin | H04N 21/25816 726/27 |
| 2014/0195602 A1 * | 7/2014 | Carricarte | H04L 67/42 709/203 |
| 2015/0173111 A1 * | 6/2015 | Agarwal | H04W 12/062 370/329 |
| 2016/0253352 A1 * | 9/2016 | Kluck | H04L 67/1097 707/638 |
| 2017/0048339 A1 * | 2/2017 | Straub | G06F 16/2379 |
| 2018/0115597 A1 * | 4/2018 | Gillette | H04L 67/18 |
| 2018/0262792 A1 * | 9/2018 | Mackay | H04N 21/4302 |

(Continued)

*Primary Examiner* — Sargon N Nano
(74) *Attorney, Agent, or Firm* — Dentons US LLP

(57) ABSTRACT

Described herein are methods and systems for the efficient resyncing of stale components of a distributed-computing system. One method includes determining that a first base component at a remote site will go offline. After determining that the first base component at the remote site will go offline, a first delta component is created at the remote site. While the first base component at the remote site is offline, data corresponding to the offline component is collected at the first delta component at the remote site. After collecting data at the first delta component, the collected data is sent to a local site. The method includes determining that the first base component has come back online. In response to determining that the first base component has come back online, the collected data is sent from the first delta component to the first base component via an intra-site network.

17 Claims, 15 Drawing Sheets

(56) References Cited

U.S. PATENT DOCUMENTS

| | | | |
|---|---|---|---|
| 2019/0327086 A1* | 10/2019 | Slowik | H04L 9/3247 |
| 2020/0106860 A1* | 4/2020 | Sullivan | H04L 67/142 |
| 2020/0112607 A1* | 4/2020 | Shoshan | H04L 67/325 |
| 2020/0341827 A1* | 10/2020 | Morard | G06F 9/547 |

* cited by examiner

EFFICIENT RESYNCHRONIZATION FOR STALE COMPONENTS OF GEOGRAPHICALLY DISTRIBUTED COMPUTING SYSTEMS

FIELD

The present disclosure relates generally to distributed-computing systems and, more specifically, to methods and systems that enable the efficient resynchronization of stale components of geographically distributed computing-systems.

BACKGROUND

Modern computing systems provide distributed data center services. Such services may be provided by a software designed data center (SDDC) that may implement one or more virtual storage area networks (e.g., a vSAN) and a virtual disk file system (e.g., a vDFS). Designers of these distributed systems struggle to meet the ever-increasing needs of their users, such as high storage efficiency for vast quantities of data, high demands for system bandwidth, recoverability for lost data, and low-latency in the event of system failures. Attempts at optimizing conventional systems for enhanced performance in any one of these system requirements may compromise the performance in one or more of the other system requirements. Thus, there is a need for enhanced efficiencies for such distributed systems.

OVERVIEW

Described herein are techniques for the efficient resyncing of the components of a distributed-computing system. In one embodiment, a method for resyncing the components of a distributed-computing system is performed. The method may include determining that a first base component at a remote site will go offline. The method may include, after determining that the first base component at the remote site will go offline, creating a first delta component at the remote site. The method may include, while the first base component at the remote site is offline, collecting inputs and outputs at the first delta component at the remote site. The method may include, after collecting inputs and outputs at the first delta component at the remote site, sending data from the first delta component at the remote site to a local site, which is different from the remote site, via a wide area network (WAN). The method may include determining that the first base component has come back online. The method may further include, in response to determining that the first base component has come back online, resyncing data from the first delta component at the remote site to the first base component at the remote site.

In one embodiment, a non-transitory computer-readable storage medium storing one or more programs configured to be executed by one or more processors is provided. The one or more programs stored by the non-transitory computer-readable storage medium include instructions for performing operations that are executable by a distributed computing system. The operations may include determining that a first base component at a remote site will go offline. The operations may include, after determining that the first base component at the remote site will go offline, creating a first delta component at the remote site. The operations may include, while the first base component at the remote site is offline, collecting inputs and outputs at the first delta component at the remote site. The operations may include, after collecting inputs and outputs at the first delta component at the remote site, sending data from the first delta component at the remote site to a local site. The operations may include determining that the first base component has come back online. The operations may further include, in response to determining that the first base component has come back online, resyncing data from the first delta component at the remote site to the first base component at the remote site.

In one embodiment, a distributed computing system for storing data may include one or more processors and memory. The memory may store one or more programs configured to be executed by the one or more processors. The one or more programs may include instructions for performing operations comprising determining that a first base component at a remote site will go offline. The operations may comprise, after determining that the first base component at the remote site will go offline, creating a first delta component at the remote site. The operations may comprise, while the first base component at the remote site is offline, collecting inputs and outputs at the first delta component at the remote site. The operations may comprise, after collecting inputs and outputs at the first delta component at the remote site, sending data from the first delta component at the remote site to a local site. The operations may comprise determining that the first base component has come back online. The operations may comprise include, in response to determining that the first base component has come back online, resyncing data from the first delta component at the remote site to the first base component at the remote site.

DETAILED DESCRIPTION

Figure 1B:
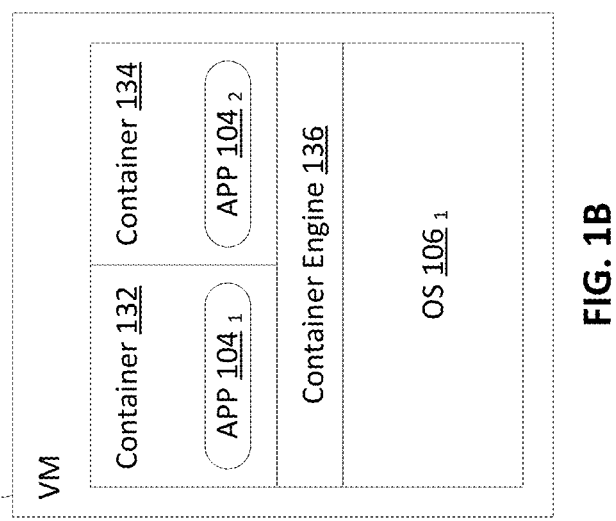
FIG. 1B is a block diagram illustrating a containerized application framework for implementing various components of a distributed-computing system, in accordance with some embodiments.

In the following description of embodiments, reference is made to the accompanying drawings in which are shown by way of illustration-specific embodiments that can be practiced. It is to be understood that other embodiments can be used and structural changes can be made without departing from the scope of the various embodiments.

Distributed computing systems, such as software designed data centers (SDDCs), may implement one or more virtual storage area networks (vSANs) and one or more virtual disk file systems (vDFS) that manages data stored on one or more virtualized storage disks. An SDDC may include a set of components and at least some of the components of the SDDC may be included in a geographically distributed cluster system. That is, components of the SDDC may be communicatively connected across multiple geographic sites. As used herein, a "site" may refer to a subset of components (of a set of components, such as but not limited to components included in an SDDC) that are physically located near each, such that the components of the same site may be communicatively coupled to one another via a Local Area Network (LAN). Components in separate sites may be communicatively coupled through a Wide Area Network (WAN). Accordingly, two SDDC components are included in the same site if the two components are communicatively coupled via a LAN. Conversely, two components are included in separate sites if the two components are commutatively coupled via a WAN.

In some embodiments, a first site of an SDDC (or another computing system) may include a first subset of the components of the SDDC and a second site of the SDDC may include a second subset of the components of the SDDC. The first site may be referred to as a local site, while the second site may be referred to as a remote site. Throughout, a LAN may be referred to as an intra-site network (or intranet) and a WAN may be referred to as an intra-site network (or an internet). As used herein, a component may include any physical or virtualized component, module, or element of an SDDC. A component may be but is not limited to a (physical or virtual) storage component (e.g., a storage disk), a (physical or virtual computing machine (e.g., a VM), a (physical or virtual) network device (e.g., a virtualized gateway or load balancer), and the like. As used throughout, a component may be referred to as a node.

Communications that takes place among the components of the SDDC may have varying properties. For example, the inter-site network used for communications between components of the SDDC at differing or separate sites may have a relatively limited bandwidth and/or a relatively high latency for input/output (I/O) operations. The intra-site network used for communications between components of the SDDC at the same site may have a relatively higher bandwidth and a relatively lower latency for I/O operations. As such, it may be less efficient for data to be communicated from a component at one site to a different site using the inter-site network than it would be to communicate the same data from a component at a site to another component at that same site using the intra-site network. In particular, it may be less efficient to resync a stale component of the SDDC by transmitting data between sites than it would be to resync the data by transmitting data within a single site. At least some of the embodiments herein are directed towards increasing the efficiency of resyncing stale components of an SDDC, by employing intra-site networks, rather than inter-site networks.

The embodiments include the efficient resyncing of stale components, while enabling tolerance for both site failure and intra-site node failure. In some examples, a component of an SDDC may include a storage disk. In some embodiments, the storage disk may be a physical storage disk. In other embodiments, the storage disk may be a virtual or virtualized storage disk. The SDDC may include components at multiple geographic sites, including a remote site and a local site. In some examples, the SDDC may include at least a first component that is a (physical or virtual) disk in first site (which is located at a first geographic location), and at least a second component that is a (physical or virtual) disk in a second site (which is located at a second geographic location). The second geographic location may be different from the first geographic location. In some examples, the first geographic location may be considered a local location, whereas the second geographic location may be considered a remote location. The SDDC may include a lead owner (coordinator) of a vSAN object at the local site, and a proxy owner at the remote site. As noted above, the components may be storage components, including physical (or virtualized) hard drives or disks storing data objects.

For fault tolerant purposes, an SDDC may employ a configuration of redundant array of independent disks, or RAID architecture. The SDDC may use data mirroring to maintain replications of data objects and/or data blocks on separate components. For instance, an SDDC may employ a RAID level-1 architecture. The SDDC may include a fault tolerance policy, such as a RAID policy. A RAID policy may require that multiple duplicates of a same data component (e.g., a data block or data object) be stored in different storage nodes. In some embodiments, a pair of mirrored components may be located at different sites and/or different geographic locations. A policy for an SDDC may require that at least two sites of the SDDC maintain two data mirrors for a data object or data block. For example, a local site may include a mirrored pair of storage nodes and a remote site may include a corresponding mirrored pair of storage nodes. For redundancy across separate geographic locations, the two mirrored pairs at the remote site may store the same data as the corresponding two mirrored pairs at the local site. If two mirrored components are stored at a first location at which user inputs/outputs (I/Os) are received, maintaining the components as up to date may be dependent on syncing the components using data from components at a second location connected to the first location via a WAN if one of the two components at the first site becomes transiently unavailable while the other component is permanently unavailable. For example, if one mirror at the remote site permanently fails, and the other mirror encounters transient failure, the mirror that experienced transient failure may be stale when the transient failure ends and the component comes back online. In that case, the stale component may need to be resynced. In a situation where there are only two sibling mirrors at the first site, the stale first component could be resynced by transmitting data from additional sibling mirror components at the second site in communication with the first site via a WAN. However, the WAN may have relatively limited bandwidth, and/or relatively high latency in comparison to the LAN network by which the two sibling mirror components at the first site are interconnected. Thus, if possible, it could be more efficient to resync the stale first component at the first site using data transmitted over the LAN than to rely on the WAN. The various embodiments provide tolerance for recovery in the event of component failures in an SDDC by allowing a stale component to be resynced in the case of a site component failure and intra-site node failure using a low-latency, high bandwidth intra-site network to resync the stale component.

Figure 1A:
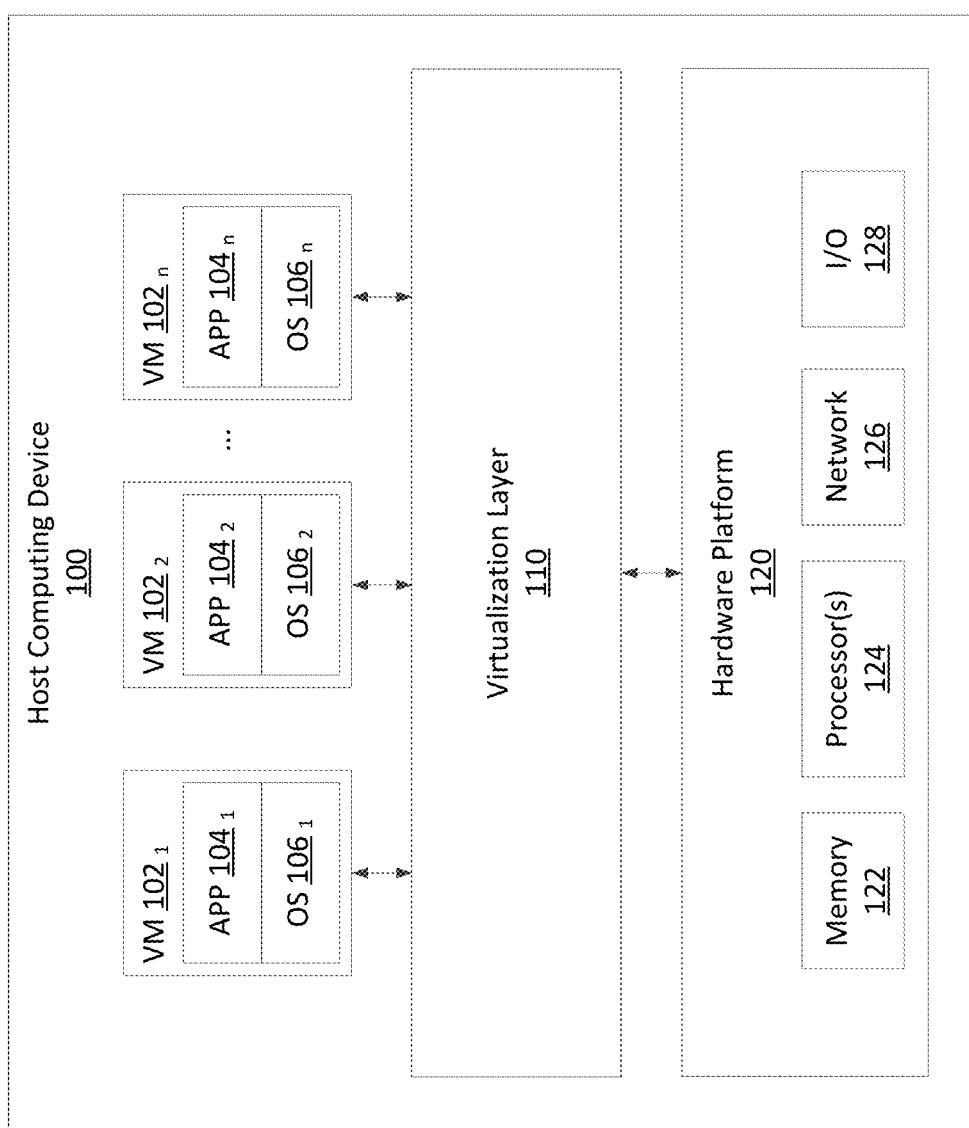
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) 1021, 1022 . . . 120n are instantiated on host computing device 100. In some embodiments, host computing device 100 implements one or more elements of a distributed-computing system (e.g., storage nodes of a vSAN 200 described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, NVMe devices, Persistent Memory, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM 1021 implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS 1061, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
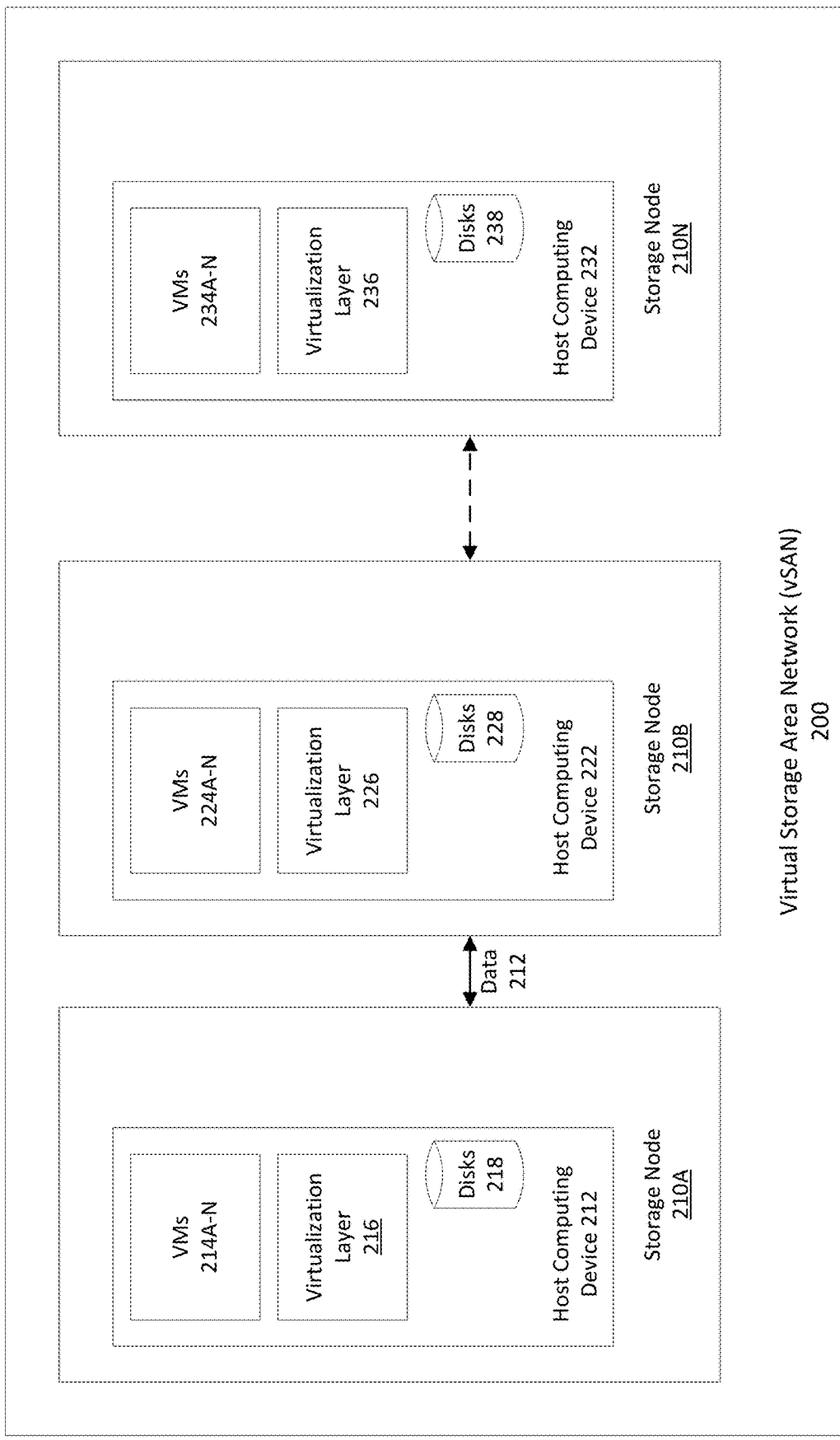
FIG. 2 is a block diagram illustrating a virtual storage area network (vSAN), in accordance with some embodiments.

FIG. 2 is a block diagram illustrating a virtual storage area network (vSAN) 200, in accordance with some embodiments. As described above, a vSAN is a logical partitioning of a physical storage area network. A vSAN divides and allocates a portion of or an entire physical storage area network into one or more logical storage area networks, thereby enabling the user to build a virtual storage pool. As illustrated in FIG. 2, vSAN 200 can include a cluster of storage nodes 210A-N, which can be an exemplary virtual storage pool. In some embodiments, each node of the cluster of storage nodes 210A-N can include a host computing device. FIG. 2 illustrates that storage node 210A includes a host computing device 212; storage node 210B includes a host computing device 222; and so forth. In some embodiments, the host computing devices (e.g., devices 212, 222, 232) can be implemented using host computing device 100 described above. For example, as shown in FIG. 2, similar to those described above, host computing device 212 operating in storage node 210A can include a virtualization layer 216 and one or more virtual machines 214A-N (collectively as VMs 214). In addition, host computing device 212 can also include one or more disks 218 (e.g., physical disks) or disk groups. In some embodiments, VM 214 can have access to one or more physical disks 218 or disk groups via virtualization layer 216 (e.g., a hypervisor). In the description of this application, a storage node is sometimes also referred to as a host computing device.

As illustrated in FIG. 2, data can be communicated among storage nodes 210A-N in vSAN 200. One or more storage nodes 210A-N can also be logically grouped or partitioned to form one or more virtual storage pools such as clusters of storage nodes. The grouping or partitioning of the storage nodes can be based on pre-configured data storage policies such as fault tolerance policies. For example, a fault tolerance policy (e.g., a redundant array of independent disks policy or a RAID policy) may require that multiple duplicates of a same data component be stored in different storage nodes (e.g., nodes 210A and 210B) such that data would not be lost because of a failure of one storage node containing one duplicate of the data component. Such a policy thus provides fault tolerance using data redundancy. In the above example, each duplicate of the entire data component can be stored in one storage node (e.g., node 210A or node 210B). As described in more detail below, in some embodiments, multiple subcomponents of a data component or duplicates thereof can be stored in multiple storage nodes using dynamic partitioning techniques, while still in compliance with the fault tolerance policy to provide data redundancy and fault tolerance. For example, a particular data component may have a size that is greater than the storage capacity of a single storage node (e.g., 256 Gb). Using the dynamic partitioning techniques, the data component can be divided to multiple smaller subcomponents and stored in multiple storage nodes. A data structure (e.g., a hash map) for the subcomponents is determined and maintained for efficient data resynchronization. It should be appreciated that multiple data components can be stored in a storage node. And data structures for the subcomponents of the multiple data components can also be determined and maintained for efficient data resynchronization.

Figure 3A:
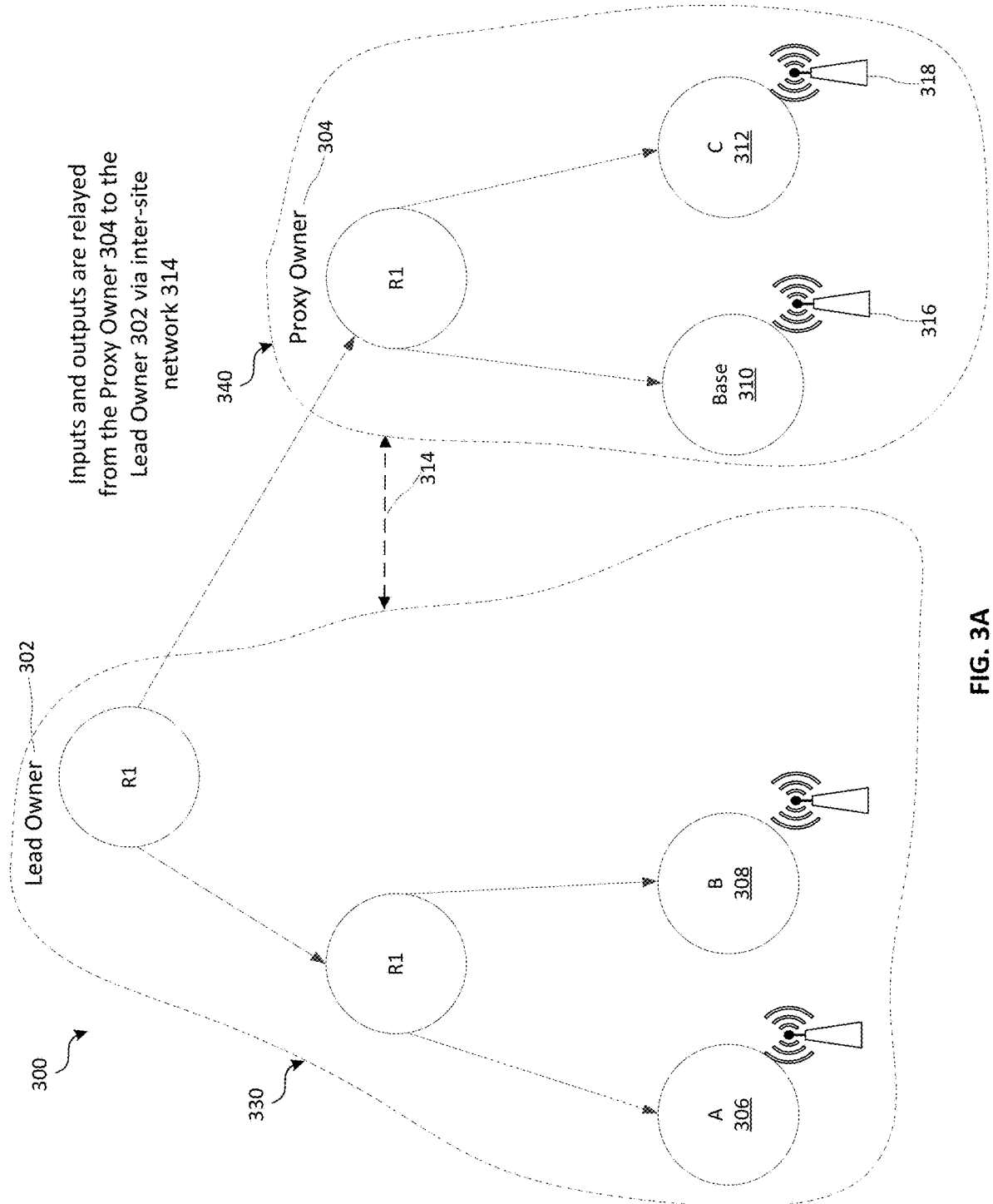
FIG. 3A illustrates an exemplary arrangement of components of a distributed-computing system.

FIG. 3A illustrates a geographically distributed cluster system 300. More specifically, FIG. 3A may illustrate at least a portion of a vSAN cluster with components (e.g., data storage components) at multiple geographic sites. System 300 may include a local site 330 and a remote site 340. FIG. 3A illustrates that the local site 330 has multiple nodes (or components), including a lead owner component 302. The lead owner component 302 is generally responsible for receiving data from another site (e.g., the remote site 340) and coordinating the propagation of that data to other components of the local site 330. For example, lead owner component 302 may relay input and output (I/O) data to other components at the local site 330. Similarly, the remote site 340 includes a proxy owner component 304. The proxy owner component 304 is generally responsible for receiving data from another site (e.g., the local site 330) and coordinating the propagation of that data to other components of the remote site 340.

System 300 may include and/or employ an inter-site network 314 that enables communication between the local site 330 and the remote site 340. Inputs and outputs of the remote site 340 can be relayed from the proxy owner component 304 at the remote site 340 to the lead owner component 302 at the local site 330, via inter-site network 314, and vice-versa. Thus, inputs and outputs received at the remote site 340 can be relayed to the local site 330. In turn, the lead owner component 302 can coordinate the propagation of those received inputs and/or outputs to other components at the local site 330 via a local intra-site network (not shown in FIG. 3A). Similarly, the proxy owner component 304 can coordinate the propagation of inputs and/or outputs to other components at the remote site 340 via a remote intra-site network (not shown in FIG. 3A). Each site of system 300 also includes two data storage components that provide data mirrors for the site. In particular, component A 306 and component B 308 are storage components that provide data mirrors at the local site 330, and component base 310 and component C 312 are storage components that provide data mirrors at the remote site 340.

In some embodiments, each of the components may be associated with various input and/or output data. For example, inputs may be received by and/or outputs may be generated by component base 310. Due to the redundancies of system 300, at least a portion of the inputs and outputs corresponding to component base 310 may be additionally stored and/or collected at component base's 310 mirrored component C 312, via the remote intra-site network. To provide additional redundancy at a geographic location that is separate from the remote location, the inputs and outputs corresponding to component base 310 may additionally be mirrored at each of component A 306 and component B 308 of the local site 330. The proxy owner 304 may provide the lead owner the inputs and outputs to mirror at component A 306 and component B 308, via the inter-site network 314. As noted above, the bandwidth associated with inter-site network 314 may be significantly less than the bandwidth associated with each of the remote and local intra-site networks. Likewise, the I/O latencies associated with inter-site network 314 may be significantly greater than the I/O latencies associated with each of the remote and local intra-site networks. As such, data transfer over the remote and local intra-site networks may be significantly more efficient than data transfers over the inter-site network 314.

In FIG. 3A, status indicator 316 of remote site 340 indicates that component base 310 is accessible or online, whereas status indicator 318 of remote site 340 indicates that component C 312 is accessible or online. Each of the other status indicators next to a component indicates that each of the corresponding components is communicatively accessible via the inter-site network 314 and/or its intra-site network. That is, each of these components is "online." From time to time, one or more components mays be taken "offline" (or otherwise become inaccessible) for maintenance or other management operations. That is, a component may become inaccessible or go offline for a "planned" or "scheduled" event. For example, component base 310 may be scheduled for routine maintenance and be taken offline at specific, known, and/or predetermined times. Each of the components is also subject to unexpected offline events. For example, component C 312 may experience an unexpected failure and become inaccessible.

Figure 3B:
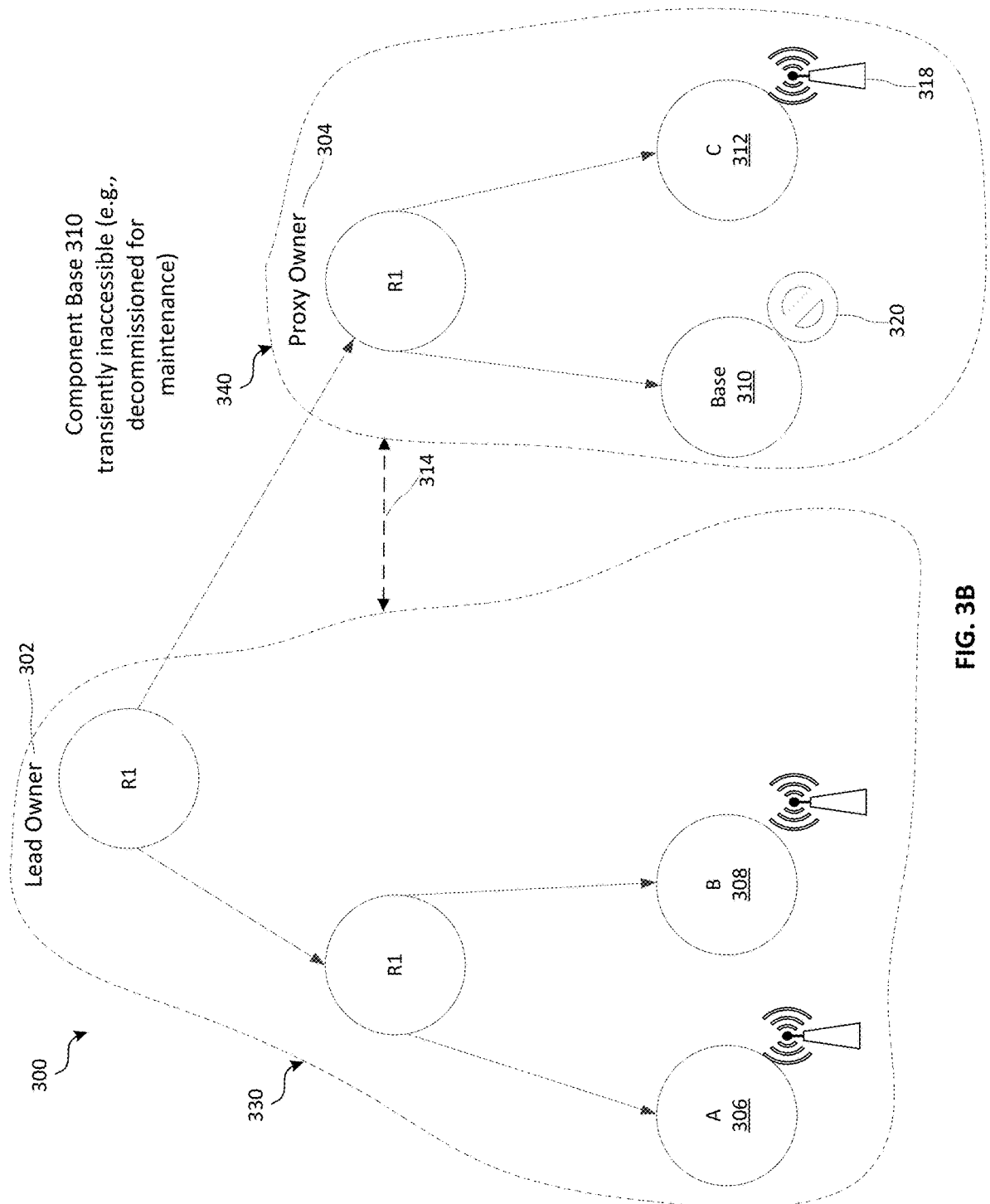
FIG. 3B illustrates an exemplary arrangement of components in a distributed-computing system, wherein the base component at a remote site has gone offline.

FIG. 3B illustrates the geographically distributed cluster system 300 of FIG. 3A, when component base 310 goes offline or otherwise becomes inaccessible. That is, FIG. 3B may illustrate system 300 in the case of a known or predictable outage of component base 310, such as but not limited to a planned maintenance or decommissioning component base 310. In various embodiments, it may be known before the base component 310 goes offline or becomes inaccessible, that component base 310 is scheduled to go offline. Status indicator 320 indicates that component base 310 is currently inaccessible or offline. The scenario in FIG. 3B occurs at some point after the scenario illustrated in FIG. 3A.

Because corresponding component C 312 acts as a data mirror for component base 310, when component base 310 is offline for scheduled maintenance or another reason, component C 312 may normally receive, collect, and/or store input and outputs corresponding to offline component base 310. As noted above, these inputs and outputs corresponding to offline component base 310 may be mirrored at component A 306 and component C 308 via data transfers over inter-site networks 314. When component base 310 comes back online (e.g., the scheduled maintenance is completed), it will be stale, i.e., it has not collected the corresponding inputs and outputs during the period of its inaccessibility. However, when component base 310 comes back online, it may be resynced via component C 312 using the relatively efficient remote intra-site network.

As with other components of a distributed computing system, component C 312 is subject to unexpected failures. Accordingly, there is a non-zero probability the both component base 310 and component C 312 may simultaneously be offline, or otherwise inaccessible, for a finite period of time. As such, there is a non-zero probability that at least a portion of the inputs and outputs corresponding to the component base 310 are not collected during component base's 310 planned outage. In such scenarios, when it is back online, stale component base 310 may be required to be resynced via data transfers from component A 306 and/or component B 308 over the relatively inefficient inter-site network 314.

Figure 3C:
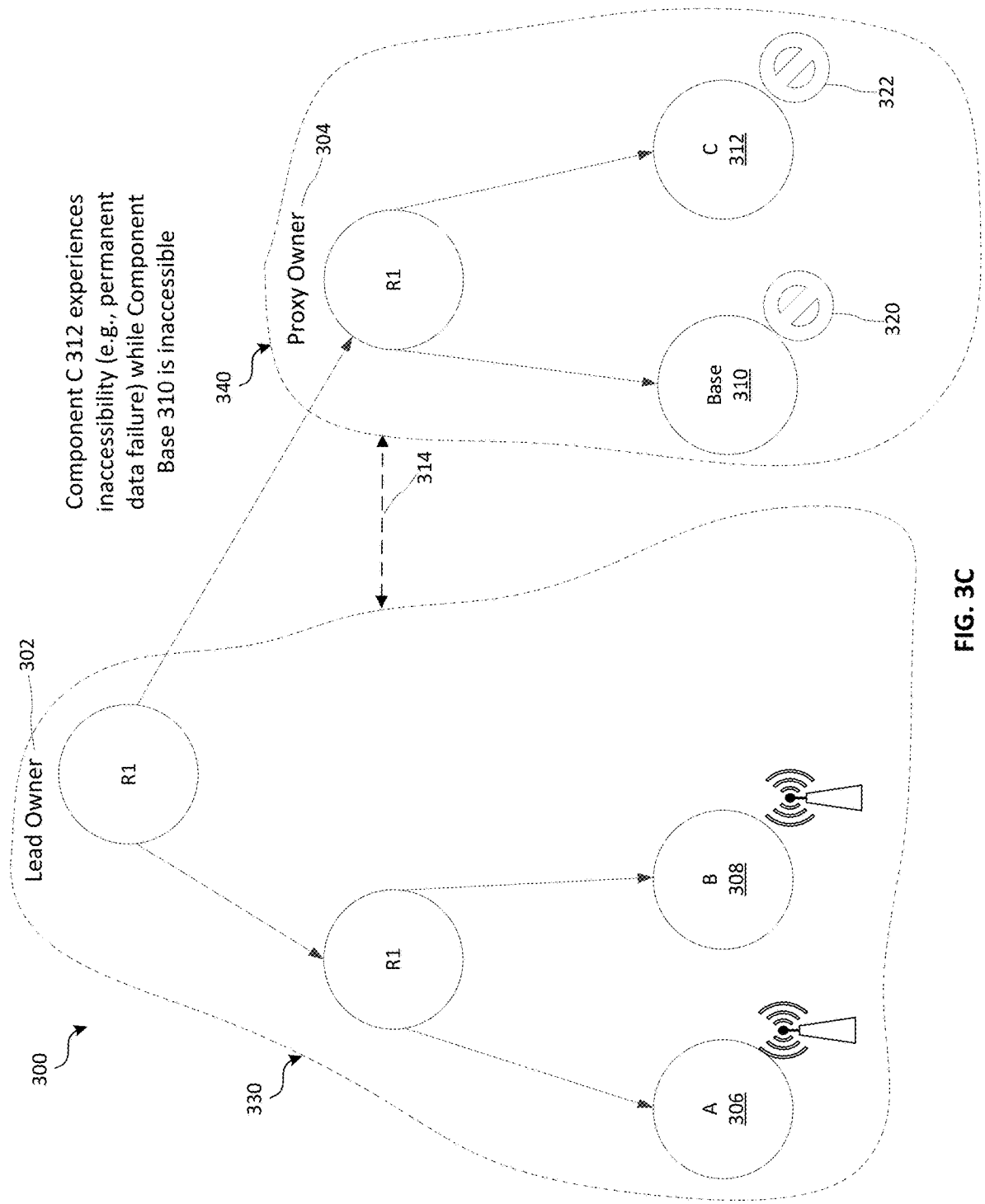
FIG. 3C illustrates an exemplary arrangement of components in a distributed-computing system, wherein both the base component and a mirror of the base component have gone offline.

FIG. 3C illustrates the geographically distributed cluster system 300 of FIG. 3B, when component C 312 becomes inaccessible or goes offline, while component base 310 is also offline (e.g., for scheduled maintenance). The scenario illustrated in FIG. 3C may occur at some point after the scenario depicted in FIG. 3B. In some cases, component C 312 has become inaccessible or gone offline permanently or for an extended period of time because of an unexpected permanent data failure during scheduled maintenance for component base 310. In some cases, component C 312 will remain inaccessible or offline beyond when component base 310 will be inaccessible or offline. Status indicator 322 indicates that component C 312 is inaccessible or offline and status indicate 320 indicate that component base 310 is offline. In this scenario, component C 312 cannot receive the inputs and outputs corresponding to component base 310 when component base 310 is offline for scheduled maintenance or another reason. As noted above, the inputs and outputs corresponding to both currently-offline component base 310 and currently-offline component C 312 may be transmitted to the local site 330 and collected and/or stored at component A 306 and component B 308 of the local site 330, via the relatively inefficient inter-site network 314.

Figure 3D:
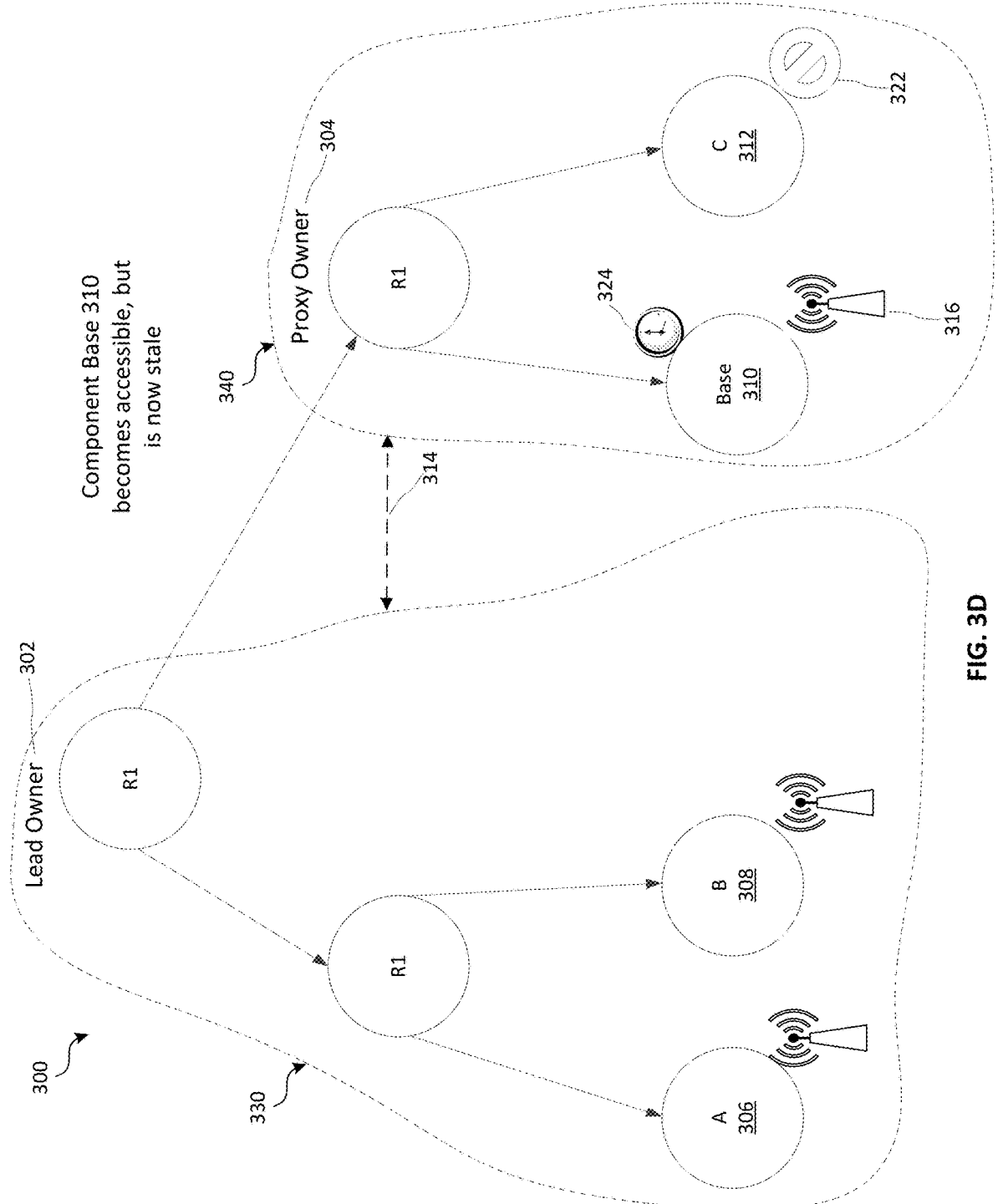
FIG. 3D illustrates an exemplary arrangement of components in a distributed-computing system wherein the base component at a remote site has become stale.

FIG. 3D illustrates the geographically distributed cluster system of FIG. 3C when component base 310 has become stale or outdated as indicated by icon 324. That is, component base 310 has come back online. Thus, the scenario illustrated in FIG. 3D takes place at some point after the scenario illustrated in FIG. 3C. At this point, component C 312 is unavailable or offline as indicated by status indicator 322. Thus, the proxy owner cannot use data from component C 312 to resync the stale component base 310.

Figure 3E:
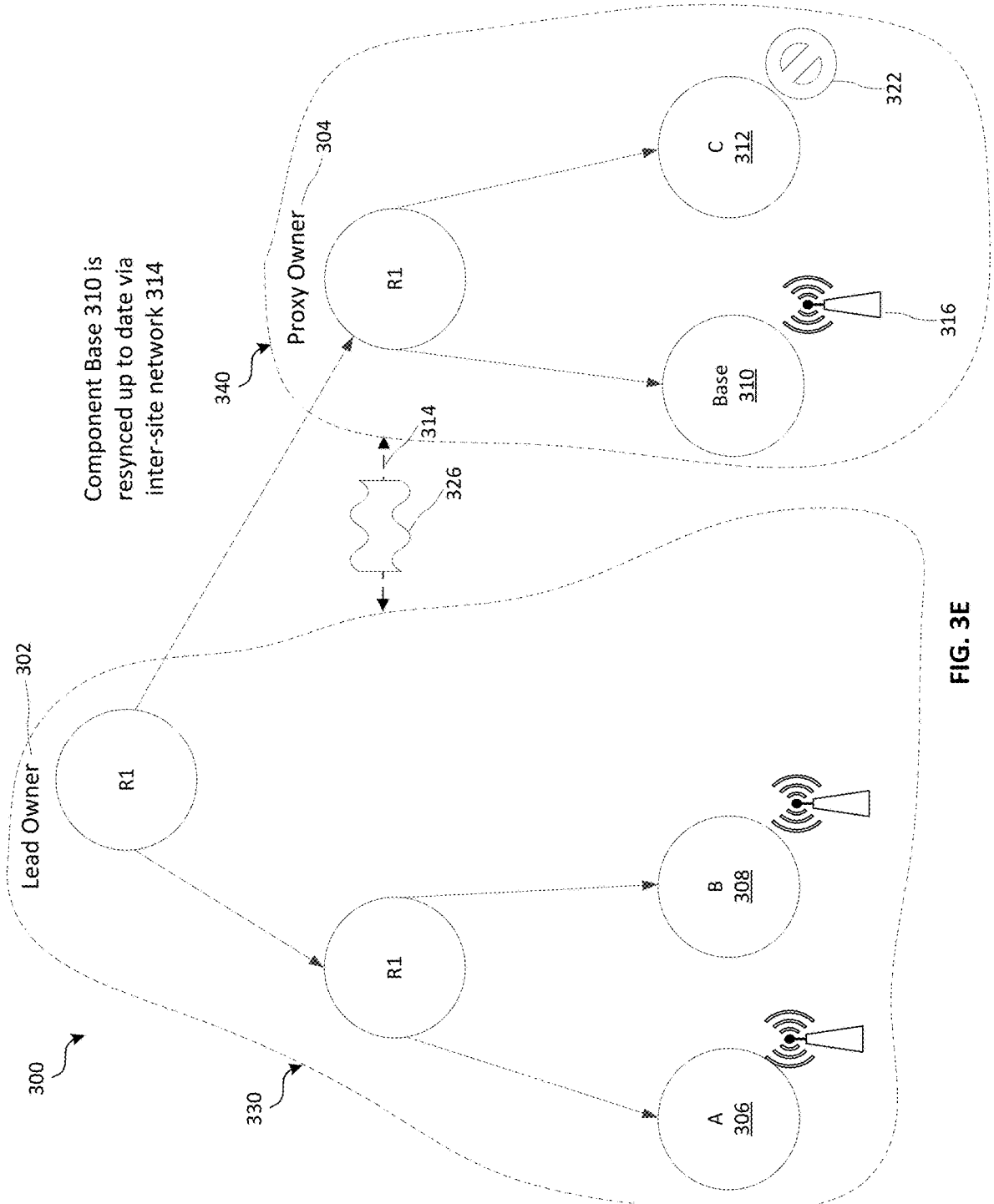
FIG. 3E illustrates that, to resync the stale base component at the remote site, data is sent from the local base component to the remote site over an inter-site network (e.g., Internet).

FIG. 3E illustrates the geographically distributed cluster system of FIG. 3D. The scenario illustrated in FIG. 3E depicts the resyncing of now online component base 310 sometime after the scenario illustrated in FIG. 3D. Because component C 312 is still offline and thus cannot be used to resync the stale component base 310, component base 310 is resynced up to date using sync data 326 sent over the relatively inefficient inter-site network 314. In some embodiments, the sync data 326 corresponds to the up-to-date data stored at component A 306 and/or component B 308. In some embodiments, the lead owner 302 coordinates the sending of the sync data 326 from the component A 306 and/or component B 308 over the inter-site network. In some embodiments, the lead owner 302 coordinates the transmission of the sync data 326 to the proxy owner 304.

It should be noted that in the embodiments shown in FIGS. 3A-3E, resyncing a stale component (e.g., component base 310) may require transmitting the synchronization data across the relatively inefficient inter-site network 314. For example, as described above, when component C 312 cannot provide the synchronization data, the resynchronization data may be transferred from the component A 306 of the local site 330 to the remote site 340, via inter-site network 314. Embodiments will be discussed in conjunction with FIGS. 4A-4G, wherein the synchronization data need not be transferred over the relatively inefficient inter-site network 314. Rather, at least due to the creation and employment of a delta component at the remote site, the synchronization data may be provided to a stale component via the more efficient remote intra-site network.

Figure 4A:
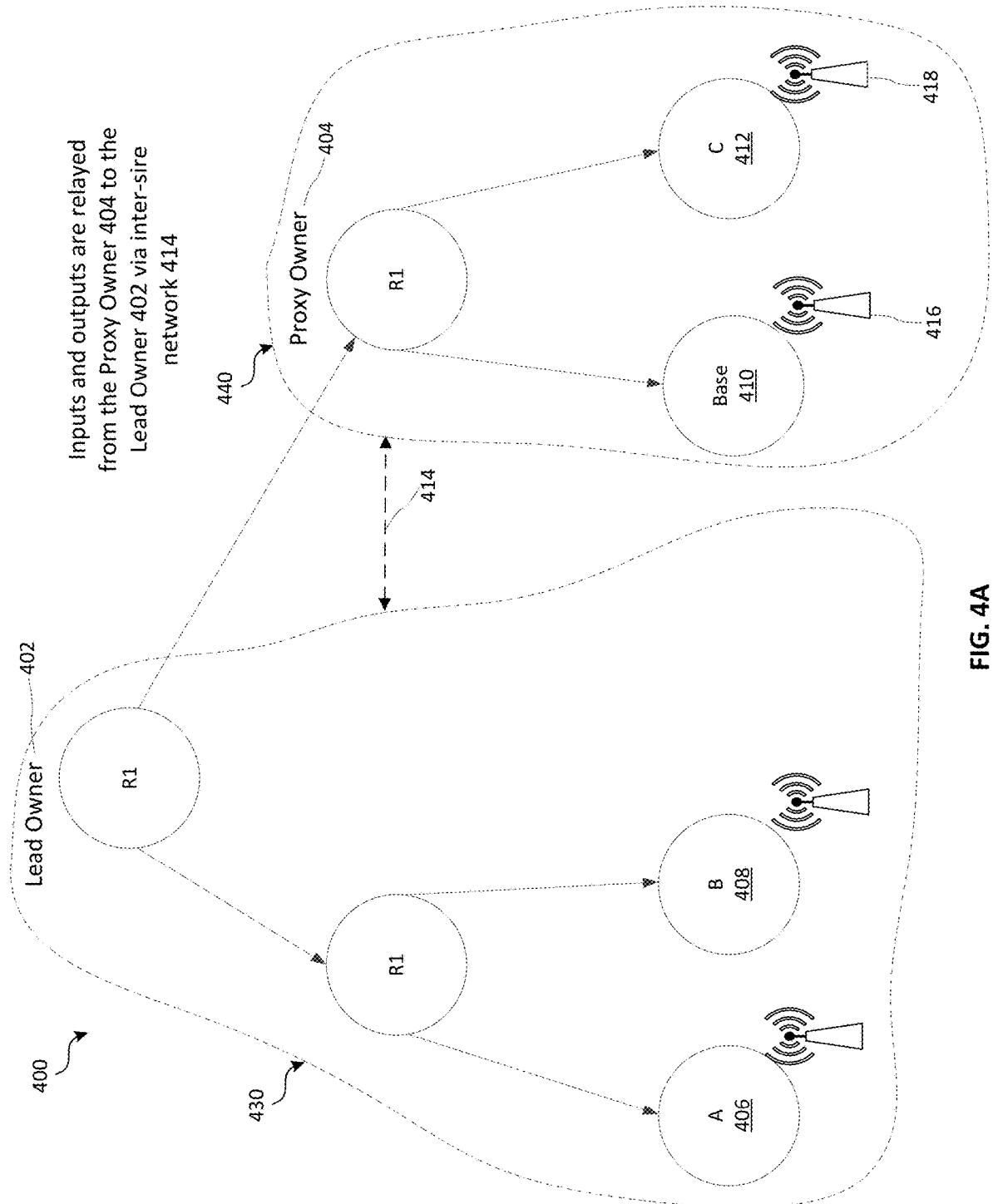
FIG. 4A illustrates an exemplary arrangement of components of a distributed-computing system.

FIGS. 4A-4G illustrate a different embodiment for resyncing a stale component using a delta (or shadow) component to handle data resync efficiently and help tolerate sibling mirror failure. For reasons discussed below, the embodiments shown in FIGS. 4A-4G may be more efficient in resyncing stale component data, as those shown in FIGS. 3A-3E. The scenario depicted in FIG. 4A is somewhat analogous to the scenario depicted in FIG. 3A. More specifically, FIG. 4A illustrates a geographically distributed cluster system 400. Similar to system 300 of FIG. 3A, system 400 may include at least a portion of a vSAN cluster with components at multiple geographic sites. Also similar to system 300, system 400 includes a local site 430 and a remote site 440. FIG. 4A illustrates that the cluster system 400 has multiple nodes in each site, with a lead owner component 402 in the local site 430. Lead owner component 402 relays inputs and outputs to other components at a local site 430, via a local intra-site network (not shown in FIG. 4A). The remote site 440 includes a proxy owner component 404 that relays inputs and outputs to other components at the remote site 440, via a remote intra-site network (not shown in FIG. 4A). System 400 also includes inter-site network 414 to enable data transmission between the local site 430 and the remote site 440. More specifically, inputs and outputs can be relayed from the proxy owner component 404 at the remote site 440 to the lead owner component 402 at the local site 430, via inter-site network 414. Thus, inputs and outputs received at the remote site 440 can be relayed to the local site 430. The lead owner component 402 can coordinate the propagation of the received inputs and/or outputs to other components at the local site 430, via the local intra-site network. Similar to system 300, system 400 also includes two data mirrors at each site (e.g., both the local site 430 and the remote site 440). As with system 300, component A 406 and component B 408 are data mirrors at the local site 430, and component base 410 and component C 412 are data mirrors at the remote site 440. In FIG. 4A, status indicator 416 indicates that component base 410 is accessible or online, and status indicator 418 indicates that component C 412 is accessible or online.

Figure 4B:
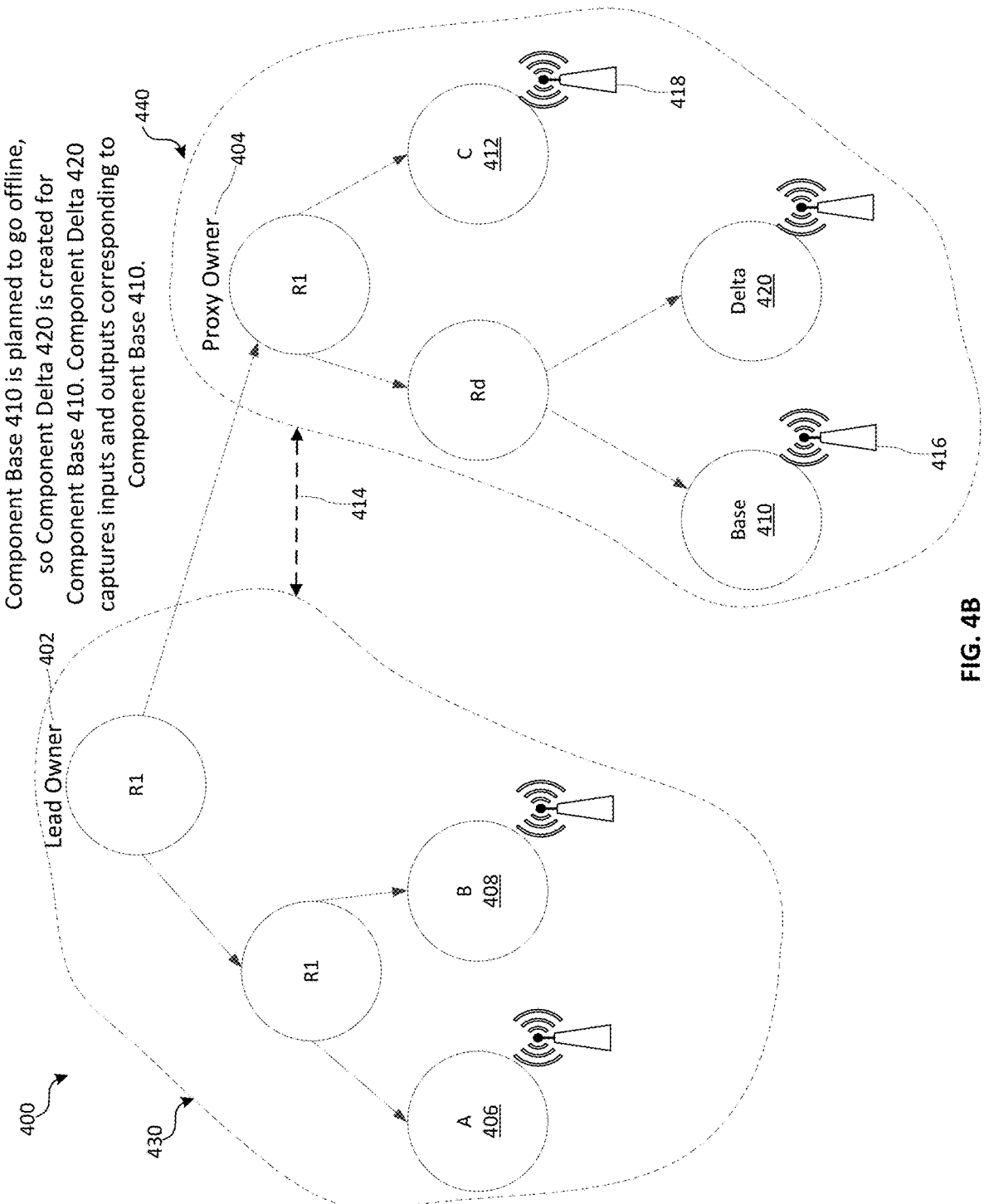
FIG. 4B illustrates an exemplary arrangement of components of a distributed-computing system where a delta component has been created after a determination that a base component will go offline.

FIG. 4B illustrates the geographically distributed cluster system 400 of FIG. 4A when component base 410 is expected to go offline or becomes inaccessible in the case of a known or predictable outage, such as planned maintenance or decommissioning the component for any reason that is known before the component goes offline or becomes inaccessible. In anticipation of an expected outage or inaccessibility of component base 410, component delta 420 is created. That is, component delta 420 may be "spun-up" or allocated in anticipation of an expected or scheduled inaccessibility of component base 410. Thus, the scenario depicted in FIG. 4B occurs subsequent to the scenario depicted in FIG. 4A and may be somewhat analogous to the scenario depicted in FIG. 3B, with the exception of delta component 420, which is not included in the embodiments of FIG. 3A-3E. While component base 410 is offline, component delta 420 may collect and/or store any inputs or outputs corresponding to component base 410.

Figure 4C:
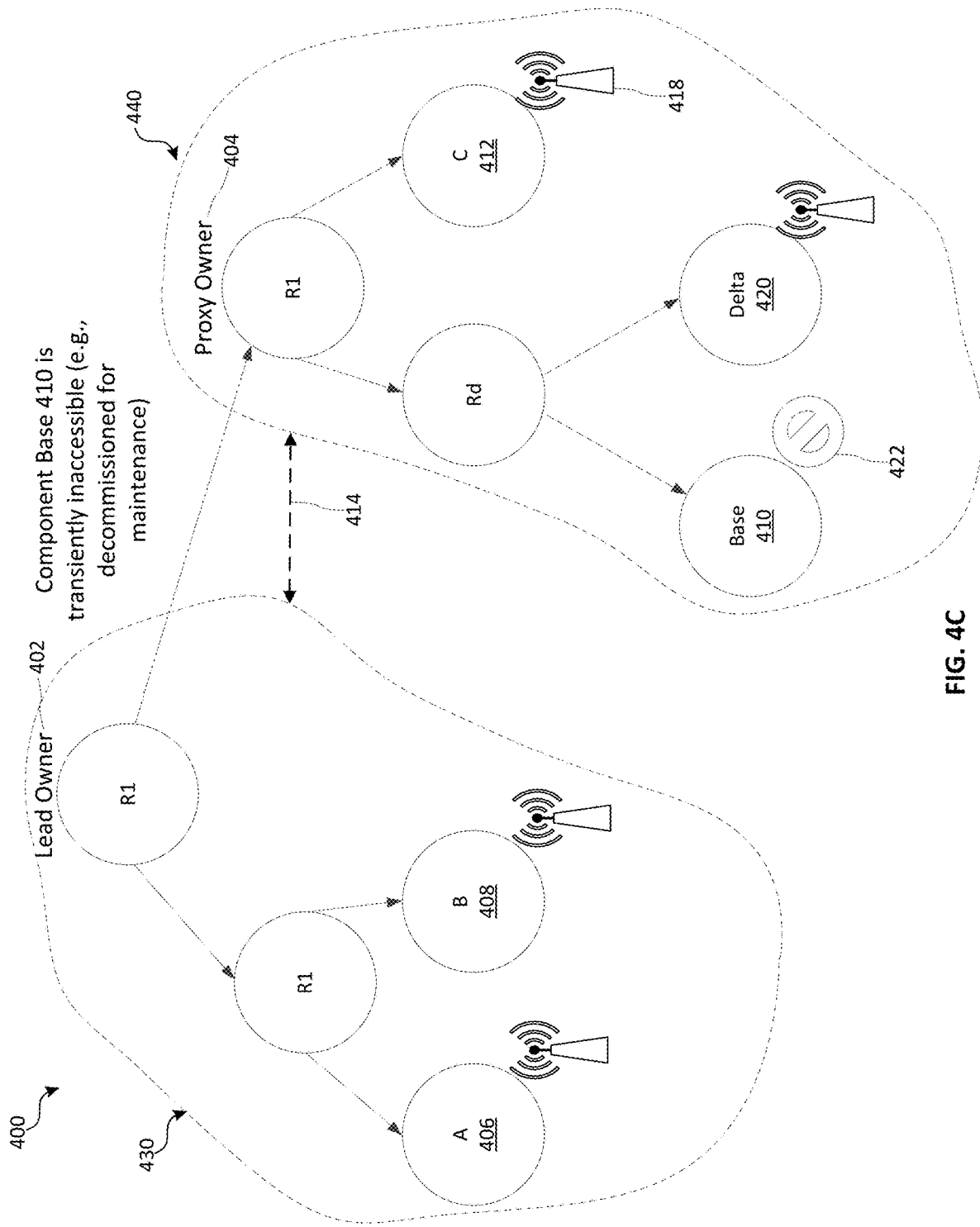
FIG. 4C illustrates an exemplary arrangement of components of a distributed-computing system, wherein a base component at a remote site has gone offline.

FIG. 4C illustrates the geographically distributed cluster system 400 of FIG. 4B when component base 410 has gone offline or has become inaccessible in the case of a known or predictable outage, such as planned maintenance or decommissioning the component for any reason that is known before the component goes offline or becomes inaccessible. Status indicator 422 indicates that component base 410 is inaccessible or offline. Thus, the scenario depicted in FIG. 4C may occur subsequent to the scenario depicted in FIG. 4B and may be somewhat analogous to the scenario depicted in FIG. 3C, with the exception of delta component, which is not included in the embodiments of FIG. 3A-3E. While component base 410 is inaccessible or offline, any inputs or outputs corresponding to offline component base 310 may be collected by and stored at component delta 420. Note that component delta 420 is communicatively coupled to each other component in the remote site 440 by the relatively efficient remote intra-site network.

Figure 4D:
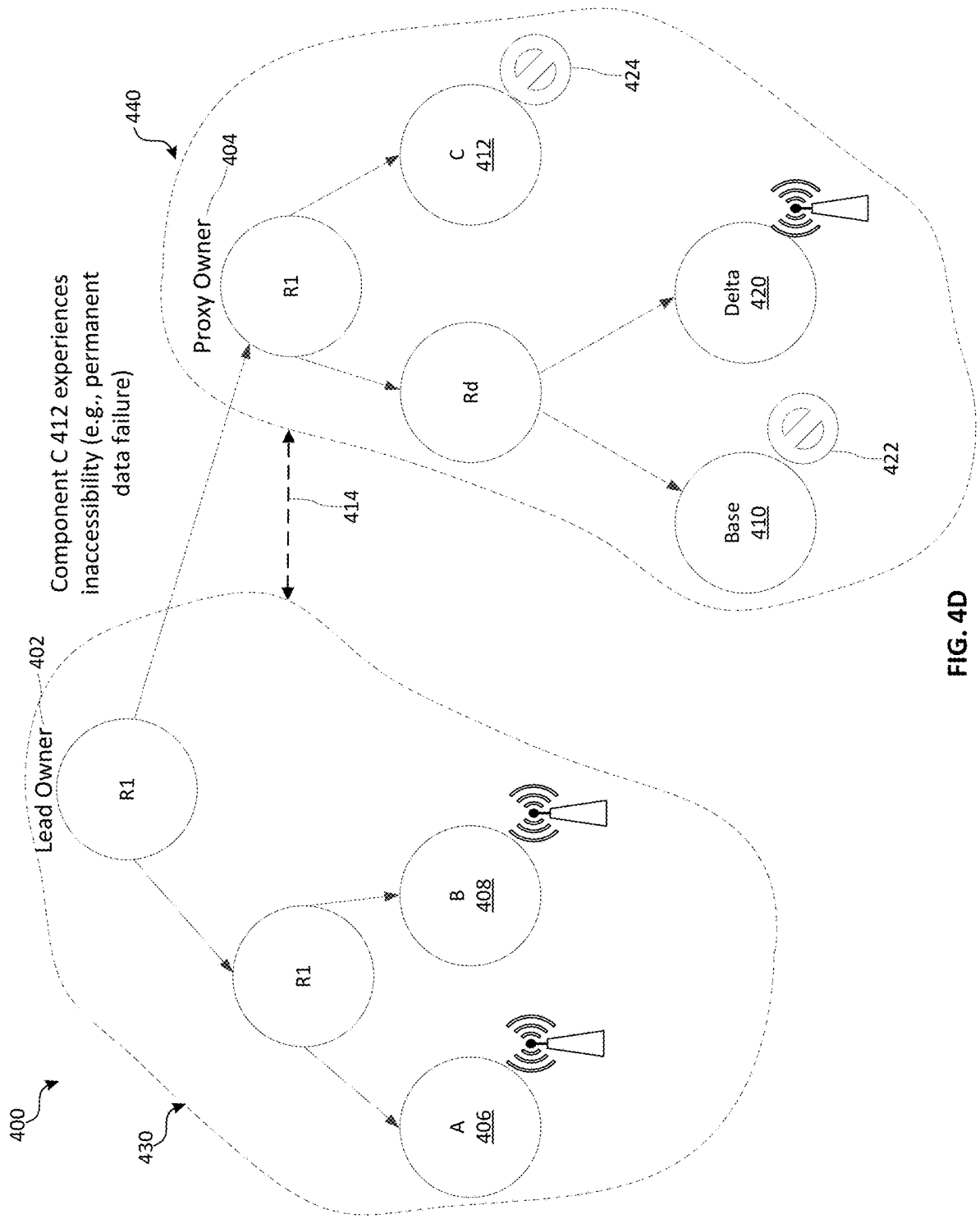
FIG. 4D illustrates an exemplary arrangement of components in a distributed-computing system, wherein both the base component and a mirror of the base component have gone offline.

FIG. 4D illustrates the geographically distributed cluster system 400 of FIG. 4C when component C 412 has gone offline or has become inaccessible. In some examples, component C 412 has gone offline or become inaccessible permanently. In some examples, component C 412 has gone offline or become inaccessible because of a permanent data failure. In some examples, component C 412 is experiencing a transient component failure due to maintenance. Status indicator 424 indicates that the component C 412 is inaccessible or offline. Thus, the scenario depicted in FIG. 4D may occur subsequent to the scenario depicted in FIG. 4C and may be somewhat analogous to the scenario depicted in FIG. 3D, with the exception of delta component 420, which is not included in the embodiments of FIG. 3A-3E.

Figure 4E:
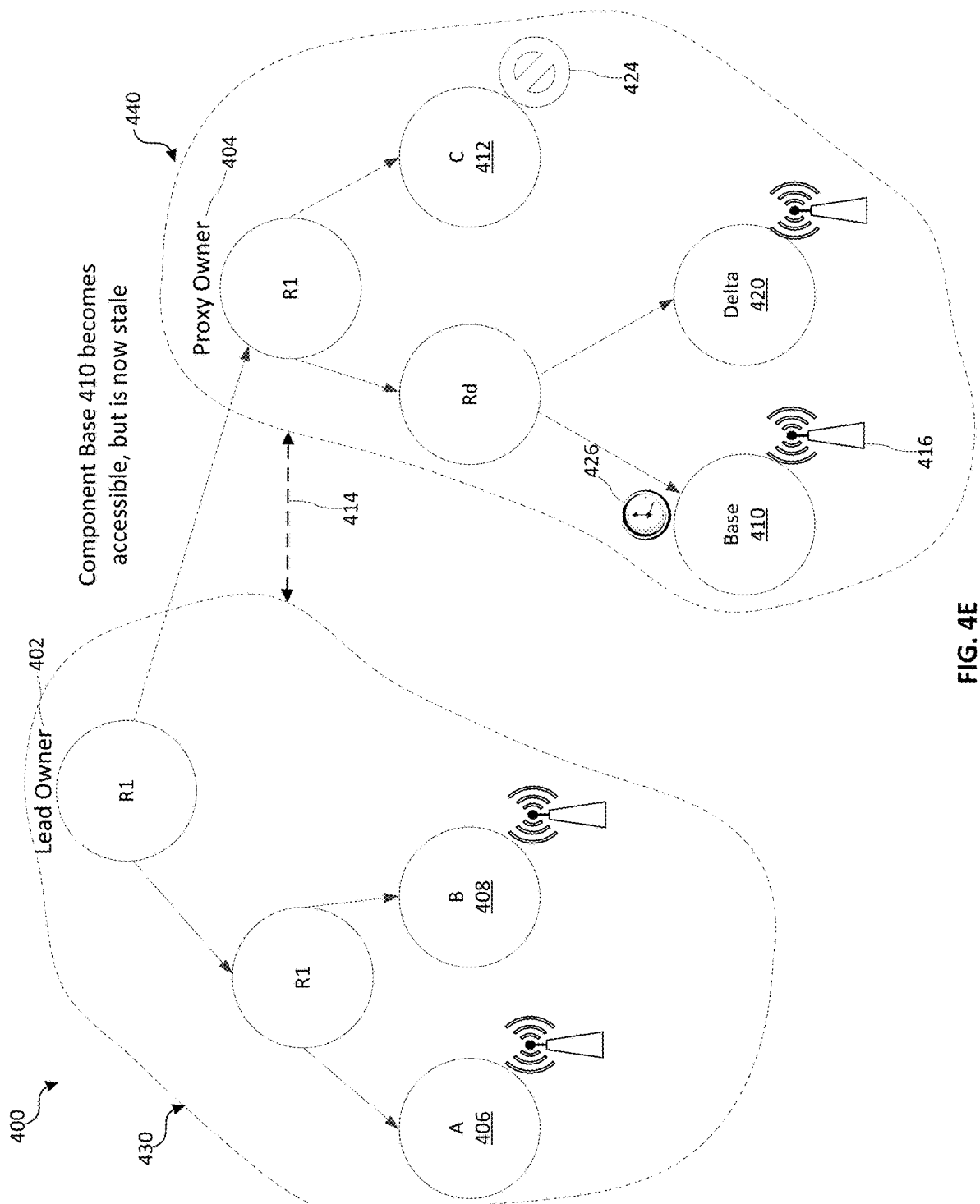
FIG. 4E illustrates an exemplary arrangement of components in a distributed-computing system wherein the base component at a remote site has become stale.

FIG. 4E illustrates the geographically distributed cluster system 400 of FIG. 4D once component base 410 has come back online or become accessible once again. Status indicator 416 indicates that component base 410 is accessible or online. However, because component base 410 was offline while inputs and outputs continued to be received, component base 410 is not up to date and has now become stale. Icon 426 indicates that component base 410 is now stale, and is not up to date. Notably, because component C 412 is offline or inaccessible, as indicated by status indicator 424, component base 410 cannot be resynced or brought back up to date using its sibling data mirror at the remote site, component C 412. However, resyncing the stale component base 410 using one of the data mirrors at the local site, component A 406 or component B 408, would require data to be sent using the inter-site network 414. Inter-site network 414 may have limited bandwidth and higher latency than an intra-network connection for transmitting data within a site. Thus, the scenario depicted in FIG. 4E may occur subsequent to the scenario depicted in FIG. 4D and may be somewhat analogous to the scenario depicted in FIG. 3E, with the exception of delta component 420, which is not included in the embodiments of FIG. 3A-3E. Due to the relative inefficiency of data transfers over the inter-site network 414, it may be preferable to resync component base 410 using data stored at the remote site where it is located, via data transfer over the relatively efficient remote intra-site network. Notably, component delta 420, which is also at the remote site, collected any inputs and outputs received while component base 410 was offline.

Figure 4F:
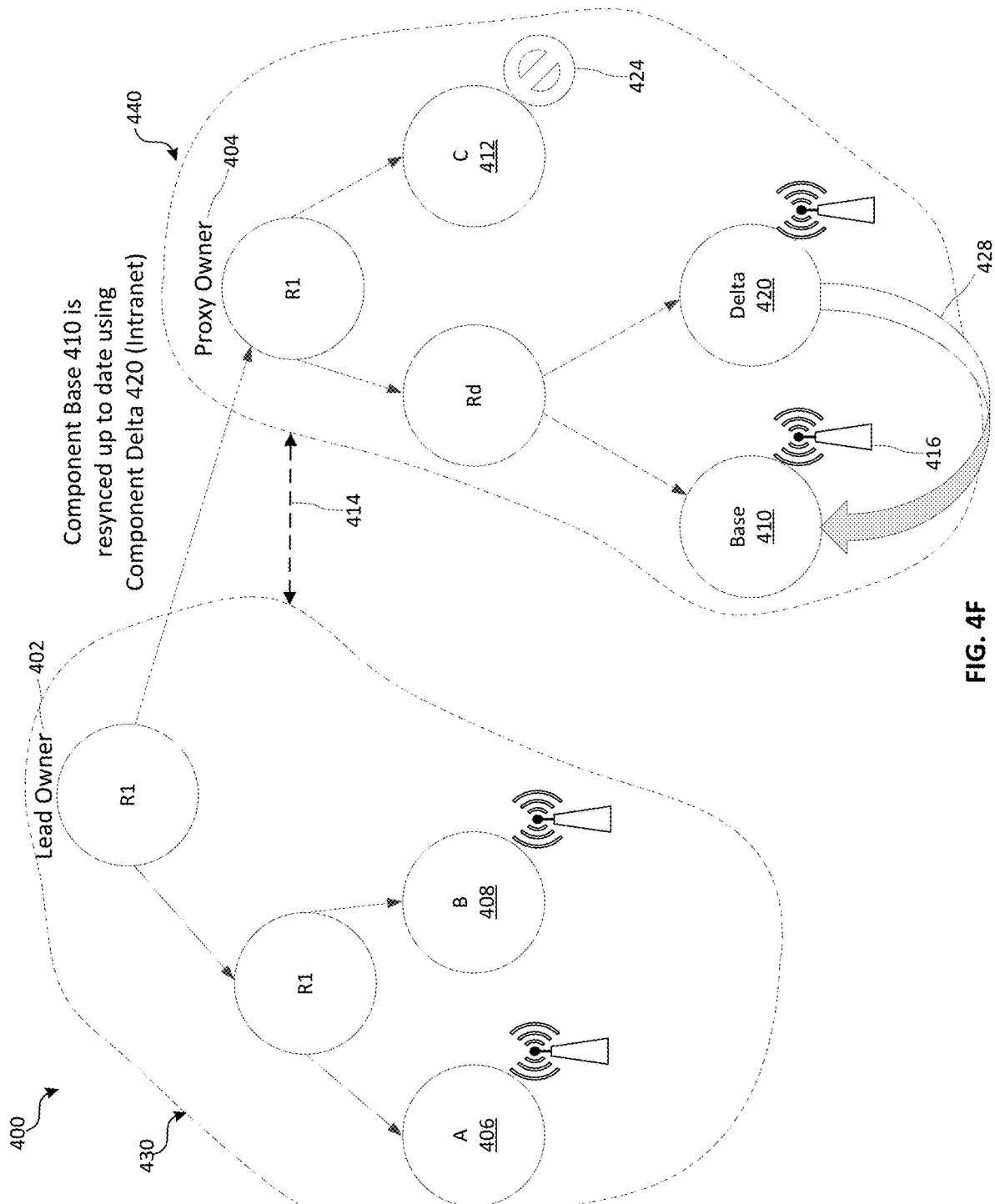
FIG. 4F illustrates that, to resync the stale base component at the remote site, data is sent from the delta component at the remote site to the base component at the remote site over an intra-site network (Intranet).

FIG. 4F illustrates the geographically distributed cluster system of FIG. 4E where component base 410 has been resynced and brought back up to date using component delta 420. Thus, the scenario illustrated in FIG. 4F may occur subsequent to the scenario depicted in FIG. 4E. As illustrated, sync data 428 goes from component delta 420 to component base 410 so that component base 410 is no longer stale. Thus, the scenario depicted in FIG. 4F may occur subsequent to the scenario depicted in FIG. 4E. This resync takes place between components within the same site, in this case the remote site, so there is no need to send additional data across inter-site network 414 in order to resync component base 410. Notably, this all takes place while the sibling data mirror of component base 410, component C 412, remains inaccessible or offline as indicated by status indicator 424. As such, component delta 420 enables the efficient data resync handled using the intra-site network while also allowing for tolerance of sibling mirror failure.

Figure 4G:
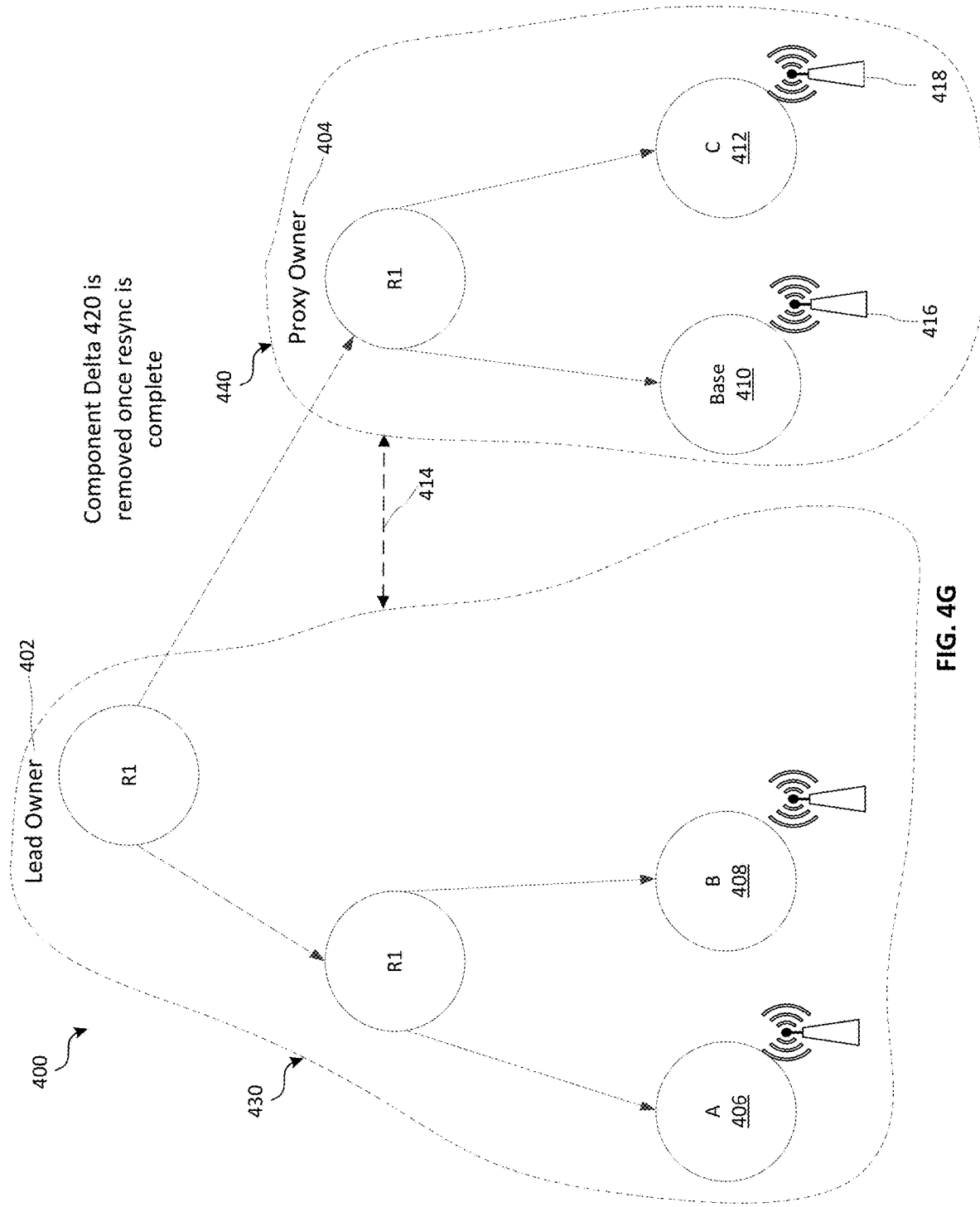
FIG. 4G illustrates that, after the base component at the remote site has been resynced, the delta component is removed.

FIG. 4G illustrates the geographically distributed cluster system of FIG. 4F once component base 410 has finished resyncing and is brought back up to date. Thus, the scenario depicted in FIG. 4G may occur subsequent to the scenario depicted in FIG. 4F. Now that component base 410 is finished resyncing and brought back up to date, component delta 420 may be deleted or removed. That is, component delta 420 is decommissioned and/or deallocated. Thus, the arrangement of the geographically distributed cluster system of FIG. 4G is similar to that illustrated in FIG. 4A prior to component base 410 going offline, and before the creation of component delta 420.

Figure 5:
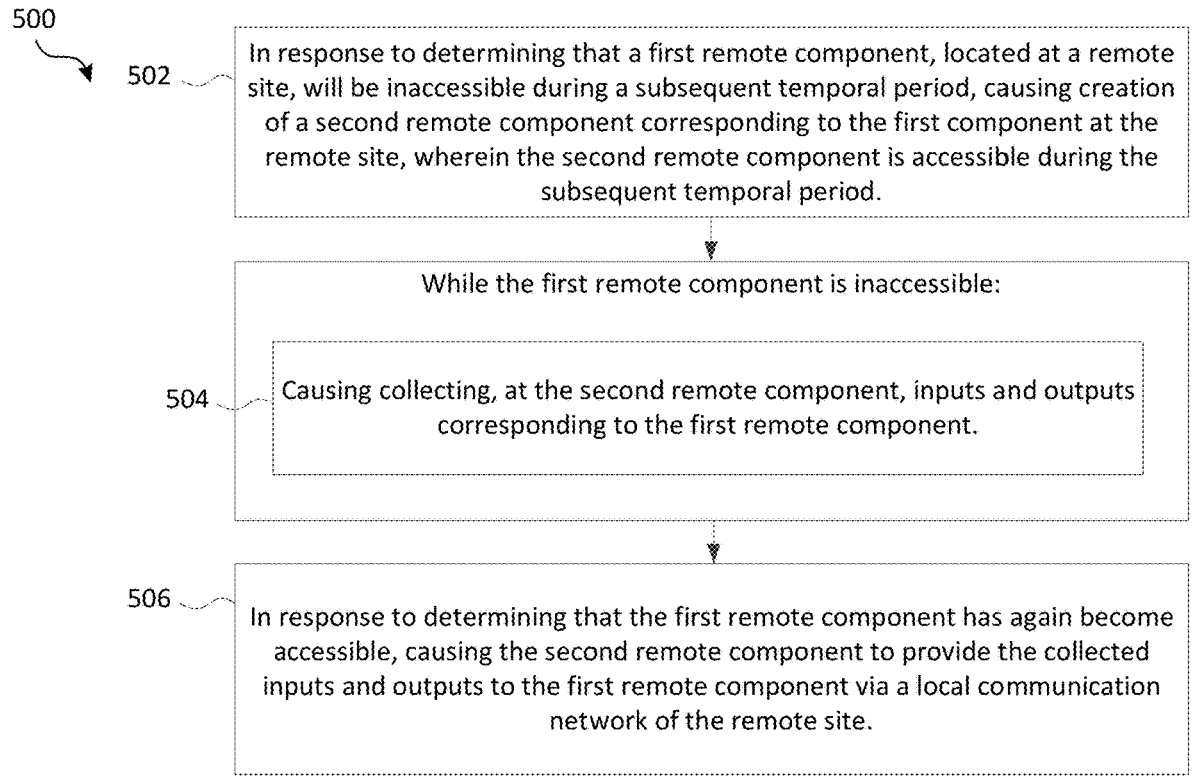
FIG. 5 illustrates a flowchart of exemplary processes for efficiently resyncing the components of a distributed-computing system, in accordance with some embodiments.

FIG. 5 is a flowchart for exemplary process 400, in accordance with some embodiments. Process 400 is performed, for example, at one or more storage nodes of a cluster of storage nodes operating in the cloud-computing environment. In some embodiments, the distributed-computing system comprises a plurality of storage nodes or host computing devices (e.g., host computing device 100 described in reference to FIG. 1A) that are communicatively coupled together in a vSAN. In some embodiments, the distributed-computing system is implemented by one or more virtual machines (e.g., VM 102 described in reference to FIGS. 1A-1B). In some embodiments, the operations of any of process 400 are distributed across the various systems (e.g., storage nodes) of the distributed-computing system. In process 400, some components are, optionally, combined, the arrangement of some components is, optionally, changed, and some components are, optionally, added or omitted. In some embodiments, additional operations may be performed in combination with process 400.

FIG. 5 illustrates a flowchart of an exemplary process 500 for efficiently resyncing the components of a distributed-computing system. Process 500 begins at step 502 in which, in response to determining that a first remote component, located at a remote site, will be inaccessible during a subsequent temporal period, a second remote component corresponding to the first component at the remote site is caused to be created, wherein the second remote component is accessible during the subsequent temporal period. The determination may be based on a signal generated by the first remote component itself. The determination may be based off of information indicating that the first remote component will go offline for scheduled maintenance. The determination may be made or handled by a proxy owner at the remote site and/or a lead owner at a local site. The determination be made on the host computing device on which the first remote component exists. The determination may also be made by a program running on the host computing device on which the first remote component exists. Alternatively, the determination may be made by a program running on a host computing device located at a local site in a different geographical location, which transmits to the determination to the remote site. If the determination is made at the local site, it may be transmitted to the remote site via an inter-site network. If the determination is made at the local site, it may be transmitted from a lead owner at the remote site to a proxy owner at the remote site. The second remote component may be stored in memory within the same host computing device in which the first remote component is stored, or it may be stored within a different host computing device. The creation of the second remote component may be initiated by a proxy owner at the remote site. The creation of the data component may take place after a signal is sent from the first remote component at the remote site. The creation of the second remote component may also be initiated by a program running on the host computing device on which the first remote component is stored. Alternatively, the creation of the second remote component may be initiated by a program running on a host computing device different from the host computing device on which the first remote component is stored.

At step 504, while the first remote component is inaccessible, inputs and outputs corresponding to the first remote component are caused to be collected at the second remote component. In some examples, the remote site where the second remote component and the first remote component are located is also where user inputs and outputs are received and generated. Inputs and outputs received at the local site may cause changes to the data within a given component, such as the first remote component. Examples of inputs and outputs may be a read instruction or a write instruction. In step 504, the inputs and outputs may be stored within the second remote component to be used for resyncing a stale first remote component.

At step 506, while the first remote component is inaccessible, inputs and outputs collected by the second remote component are received at the local site.

At step 508, in response to determining that the first remote component has again become accessible, the second remote component is caused to provide the collected inputs and outputs to the first remote component via a local communication network of the remote site. In some examples, inputs and outputs are collected at the second remote component at the remote site, so providing the collected inputs and outputs to the first remote component via a local communication network of the remote site involves sending data from the second remote component at the remote site to the first remote component at the remote site via an Intranet. In some examples, a local site allows data mirrors at the local site to update based on the inputs and outputs received at the remote site. In some examples, the data provided from the second remote component at the remote site to the local site may contain read or write instructions that may cause the data mirrors at the local site to perform certain operations, and/or to be updated. In some examples, the first remote component may send an alert when it comes back online, or a different component of the vSAN may ping the first remote component and receive a response to determine that it has come back online. The first remote component coming back online may correspond to it becoming accessible by other components in the vSAN again.

Described herein are techniques for resyncing the components of a distributed-computing system is performed. In one embodiment, a method for resyncing the components of a distributed-computing system is performed. The method may include, in response to determining that a first remote component, located at a remote site, will be inaccessible during a subsequent temporal period, causing creation of a second remote component corresponding to the first component at the remote site, wherein the second remote component is accessible during the subsequent temporal period.

The method may include, while the first remote component is inaccessible, causing collecting, at the second remote component, inputs and outputs corresponding to the first remote component.

The method may include, while the first remote component is inaccessible, receiving, at the local site, the inputs and the outputs collected by the second remote component.

The method may further include, in response to determining that the first remote component has again become accessible, causing the second remote component to provide the collected inputs and outputs to the first remote component via a local communication network of the remote site. The first remote component and the second remote component may be virtual disks. The first remote component and the second remote component may be stored may be on different physical disks at the same geographic site. The first remote component and the second remote component, at least partially as a result of being located at the same geographic site, may be capable of communicating using an intra-site communication network, or Intranet. The first remote component and the second remote component may be part of a cluster of nodes in a system employing RAID 1 policy to provide tolerance for site failures. The geographic site at which the first remote component and the second remote component are stored may also include an additional component, which may be a virtual disk that is a mirror of the first remote component.

In some embodiments, the second remote component provides the collected inputs and outputs to the first remote component via a local communication network of the remote site after a third remote component, located at the remote site, has become inaccessible, wherein the third remote component is a sibling mirror of the first remote component. The third remote component may become inaccessible, or go offline, transiently or permanently. The third remote component becoming permanently inaccessible may correspond to the only sibling mirror of the first remote component becoming inaccessible, which would limit the ability to resync the first remote component if or when that component becomes accessible again, or goes back online.

In some embodiments, the first remote component at the remote site going offline corresponds to the first remote component at the remote site undergoing maintenance service.

In some embodiments the method further includes, after causing the second remote component to provide the collected inputs and outputs to the first remote component via a local communication network of the remote site, deleting the second remote component at the remote site.

In some embodiments, inputs and outputs corresponding to the first remote component are collected at the second remote component via the local communication network of the remote site.

In some embodiments, data from the second remote component at the remote site is caused to be provided to the first remote component via the local communication network of the remote site by a lead owner. In some cases, no guest inputs/outputs are received or accepted at the lead owner. Rather, in some cases, all inputs/outputs are received at the remote site by a proxy owner.

In some embodiments, data from the second remote component at the remote site is provided to the local site using an inter-site network. The data from the second remote component at the remote site may be provided to the local site using the inter-site network so that the inputs/outputs received at the remote site can be propagated through to mirror components at the local site. The policy or configuration of the SDDC in which the components exist may allow for data mirrors spanning both the local site and the remote site. Where guest inputs/outputs are only received at the remote site, it may be necessary to provide or transmit some data corresponding to the guest inputs/outputs received at the remote site to the local site in order for mirrors of remote component at the local site to be synced.

In some embodiments the method further includes, after causing the second remote component to provide the collected inputs and outputs to the first remote component via the local communication network of the remote site, propagating the data to at least a first local component using an inter-site network. The data may be propagated to at least the first local component using an intra-site network rather than an inter-site network to take advantage of the higher bandwidth and/or lower latency of the intra-site network.

In some embodiments, the first local component is a mirror of the first remote component.

In some embodiments, for each input or output collected at the second remote component at the remote site, one copy of data from the second remote component is sent to the local site using the inter-site network. In this way, only one copy of the data from the second remote component is sent on the inter-site network for every guest input or output, and then may be propagated to local components during resyncing using an intra-site network. The intra-site network may have higher bandwidth and/or lower latency than the inter-site network, so minimizing the amount of inter-site network traffic may be advantageous from a network traffic perspective.

In some embodiments, resyncing data from the second remote component at the remote site to the first remote component at the remote site is performed using the local communication network of the remote site. The data may be propagated to at least the first local component using an intra-site network rather than an inter-site network to take advantage of the higher bandwidth and/or lower latency of the intra-site network.

In some embodiments, a proxy owner is maintained at the remote site while the remote site has at least one active remote component at the remote site. The proxy owner may be maintained so long as the remote site includes at least one active mirror or one active component at which inputs or outputs are collected while another component is offline. The proxy owner may relay inputs and outputs to the local site via a lead owner or coordinator of a vSAN object at the local site, in order to reduce inter-site input and output amplification. Allowing the proxy owner to handle resync data traffic internally may have better performance than that when the inputs/outputs are coordinated by the lead owner, and are required to cross the inter-site network.

In some embodiments, sending the data from the second remote component at the remote site to the local site is performed using the proxy owner.

In some embodiments, the first remote component corresponds to a first virtual disk and the second remote component corresponds to a second virtual disk.

In some embodiments, the remote site is different from the local site, and the remote site and the local site are geographically distanced from one another.

In accordance with some implementations, a computer-readable storage medium (e.g., a non-transitory computer-readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for improving performance within a distributed computing system, the method comprising:
in response to determining that a first remote component, located at a remote site, will be inaccessible during a subsequent temporal period, causing allocation of a second remote component, at the remote site, corresponding to the first component, wherein the second remote component is accessible during the subsequent temporal period;
while the first remote component is inaccessible during the subsequent temporal period:
causing collection, at the second remote component, of data corresponding to the first remote component; and
storing, at a local site, the data collected by the second remote component via an inter-site network that communicatively couples the remote site and the local site; and
in response to determining that the first remote component has again become accessible, causing the second remote component to provide the collected data, corresponding to the first remote component, to the first remote component via an intra-site network of the remote site, wherein a proxy owner component of the remote site coordinates providing the collected data from the second remote component to the first remote component via the intra-site network.

2. The method of claim 1, wherein the second remote component provides the collected data to the first remote component via the intra-site network of the remote site after a third remote component, located at the remote site, has become inaccessible, wherein the third remote component is a mirrored component of the first remote component.

3. The method of claim 1, wherein the first remote component at the remote site becoming inaccessible corresponds to the first remote component at the remote site undergoing maintenance service.

4. The method of claim 1, further comprising:
after the second remote component has provided the collected data to the first remote component via the intra-site network of the remote site, deallocating the second remote component at the remote site.

5. The method of claim 1, wherein the data corresponding to the first remote component is collected at the second remote component via the intra-site network of the remote site.

6. The method of claim 1, wherein the remote site is physically located at a first geographical location and the local site is physically located at a second geographic location that is separated from the first geographical location.

7. A distributed computing system for storing data, the system comprising:
one or more processors; and
a memory storing one or more programs configured to be executed by the one or more processors, the one or more programs including instructions for performing operations comprising:
in response to determining that a first remote component, located at a remote site, will be inaccessible during a subsequent temporal period, causing allocation of a second remote component, at the remote site, corresponding to the first component, wherein the second remote component is accessible during the subsequent temporal period;
while the first remote component is inaccessible during the subsequent temporal period:
causing collection, at the second remote component, of data corresponding to the first remote component; and
storing, at a local site, the data collected by the second remote component via an inter-site network that communicatively couples the remote site and the local site; and
in response to determining that the first remote component has again become accessible, causing the second remote component to provide the collected data, corresponding to the first remote component, to the first remote component via an intra-site network of the remote site, wherein a proxy owner component of the remote site coordinates providing the collected data from the second remote component to the first remote component via the intra-site network.

8. The system of claim 7, wherein the second remote component provides the collected data to the first remote component via the intra-site network of the remote site after a third remote component, located at the remote site, has become inaccessible, wherein the third remote component is a mirrored component of the first remote component.

9. The system of claim 7, wherein the first remote component at the remote site becoming inaccessible corresponds to the first remote component at the remote site undergoing maintenance service.

10. The system of claim 7, the operations further comprising: after the second remote component has provided the collected data to the first remote component via the intra-site network of the remote site, deallocating the second remote component at the remote site.

11. The system of claim 7, wherein the data corresponding to the first remote component is collected at the second remote component via the intra-site network of the remote site.

12. The system of claim 7, wherein the remote site is physically located at a first geographical location and the local site is physically located at a second geographic location that is separated from the first geographical location.

13. A non-transitory computer-readable storage medium storing one or more programs configured to be executed by a distributed computing system comprising one or more processors and memory, the one or more programs including instructions for performing operations comprising:
in response to determining that a first remote component, located at a remote site, will be inaccessible during a subsequent temporal period, causing allocation of a second remote component, at the remote site, corresponding to the first component, wherein the second remote component is accessible during the subsequent temporal period;
while the first remote component is inaccessible during the subsequent temporal period:
causing collection, at the second remote component, of data corresponding to the first remote component; and
storing, at a local site, the data collected by the second remote component via an inter-site network that communicatively couples the remote site and the local site; and
in response to determining that the first remote component has again become accessible, causing the second remote component to provide the collected data, corresponding to the first remote component, to the first remote component via an intra-site network of the remote site, wherein a proxy owner component of the remote site coordinates providing the collected data from the second remote component to the first remote component via the intra-site network.

14. The storage medium of claim 13, wherein the second remote component provides the collected data to the first remote component via the intra-site network of the remote site after a third remote component, located at the remote site, has become inaccessible, wherein the third remote component is a mirrored component of the first remote component.

15. The storage medium of claim 13, wherein the first remote component at the remote site becoming inaccessible corresponds to the first remote component at the remote site undergoing maintenance service.

16. The storage medium of claim 13, the operations further comprising:
after the second remote component has provided the collected data to the first remote component via the intra-site network of the remote site, deallocating the second remote component at the remote site.

17. The storage medium of claim 13, wherein the data corresponding to the first remote component is collected at the second remote component via the intra-site network of the remote site.

* * * * *